(12) United States Patent
Valkaitis

(10) Patent No.: US 11,831,612 B2
(45) Date of Patent: *Nov. 28, 2023

(54) PROVIDING SUBSTITUTE DOMAIN INFORMATION IN A VIRTUAL PRIVATE NETWORK

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,652

(22) Filed: Nov. 1, 2021

(65) Prior Publication Data

US 2023/0139110 A1    May 4, 2023

Related U.S. Application Data

(63) Continuation of application No. 17/516,612, filed on Nov. 1, 2021.

(51) Int. Cl.
*H04L 9/40*      (2022.01)
*H04L 9/06*      (2006.01)

(52) U.S. Cl.
CPC ........ *H04L 63/0272* (2013.01); *H04L 9/0643* (2013.01); *H04L 63/0236* (2013.01); *H04L 63/0421* (2013.01); *H04L 63/20* (2013.01)

(58) Field of Classification Search
CPC ............ H04L 63/0272; H04L 63/0236; H04L 63/0421; H04L 63/20
USPC .......................................................... 726/15
See application file for complete search history.

(56) References Cited

U.S. PATENT DOCUMENTS

| | | | |
|---|---|---|---|
| 8,104,081 B2* | 1/2012 | Khanna | H04L 67/1001 709/217 |
| 10,592,952 B2* | 3/2020 | Catino | G06Q 30/0625 |
| 2010/0306410 A1* | 12/2010 | Jansen | H04L 67/51 709/245 |
| 2020/0036685 A1* | 1/2020 | Liu | H04L 67/01 |

* cited by examiner

*Primary Examiner* — Anthony D Brown
(74) *Attorney, Agent, or Firm* — The Pattani Law Group

(57) ABSTRACT

A method in a virtual private network (VPN) environment, the method including determining, by a processor, that a VPN service provider is unreachable via utilization of received domain information; determining, by the processor, first substitute domain information based at least in part on determining that the VPN service provider is unreachable via utilization of the received domain information; and determining, by the processor, second substitute domain information based at least in part on determining that the VPN service provider is unreachable via utilization of the first substitute domain information, the second substitute domain information being different than the first substitute domain information. Various other aspects are contemplated.

20 Claims, 6 Drawing Sheets

PROVIDING SUBSTITUTE DOMAIN INFORMATION IN A VIRTUAL PRIVATE NETWORK

CROSS REFERENCE

This application is a continuation of U.S. Non-Provisional patent application Ser. No. 17/516,612, filed on Nov. 1, 2021, and titled "Providing Substitute Domain Information In A Virtual Private Network," the entire contents of which are incorporated herein by reference.

FIELD OF DISCLOSURE

Aspects of the present disclosure generally relate to a virtual private network (VPN), and more particularly to providing substitute domain information in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encrypted, unreadable format with help of an encryption algorithm. Decryption may be associated with changing the data from being in the encrypted, unreadable format to being in the transparently readable format with help of a decryption algorithm. In an example, encrypted data may be decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated bits, and, when using a given encryption algorithm, the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., a token provider to provide one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for providing substitute domain information in a VPN, the method including receiving, at a processor associated with a device, domain information associated with a VPN service provider; determining, by the processor, substitute domain information based at least in part on determining that the VPN service provider is unreachable via utilization of the domain information, the determining the substitute domain information being based at least in part on utilizing a time marker and a string of alphanumeric characters associated with the VPN service provider; and transmitting, by the processor, a connection request to reach the VPN service provider by utilizing the substitute domain information.

In another aspect, the present disclosure contemplates a device associated with a VPN, the device including a memory and a processor configured to: receive domain information associated with a VPN service provider; determine substitute domain information based at least in part on determining that the VPN service provider is unreachable via utilization of the domain information, the substitute domain information being determined based at least in part on utilizing a time marker and a string of alphanumeric characters associated with the VPN service provider; and transmit a connection request to reach the VPN service provider by utilizing the substitute domain information.

In another aspect, the present disclosure contemplates a non-transitory computer readable medium storing instructions, which when executed by a processor cause the processor to: receive domain information associated with a VPN service provider; determine substitute domain information based at least in part on determining that the VPN service provider is unreachable via utilization of the domain information, the substitute domain information being determined based at least in part on utilizing a time marker and a string of alphanumeric characters associated with the VPN service provider; and transmit a connection request to reach the VPN service provider by utilizing the substitute domain information.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
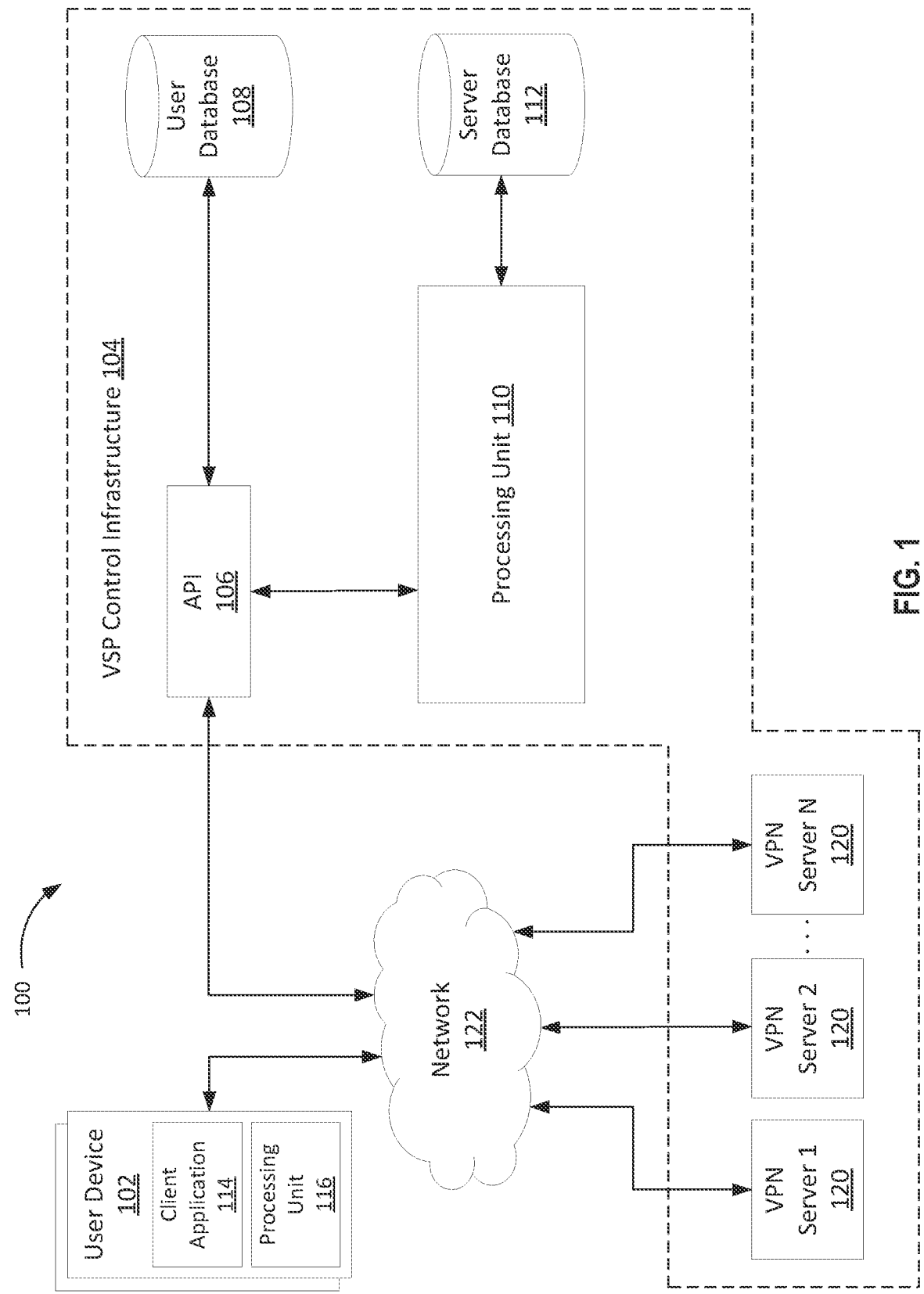

FIG. 1 is an illustration of an example system associated with providing substitute domain information in a VPN, according to various aspects of the present disclosure.

Figure 2:
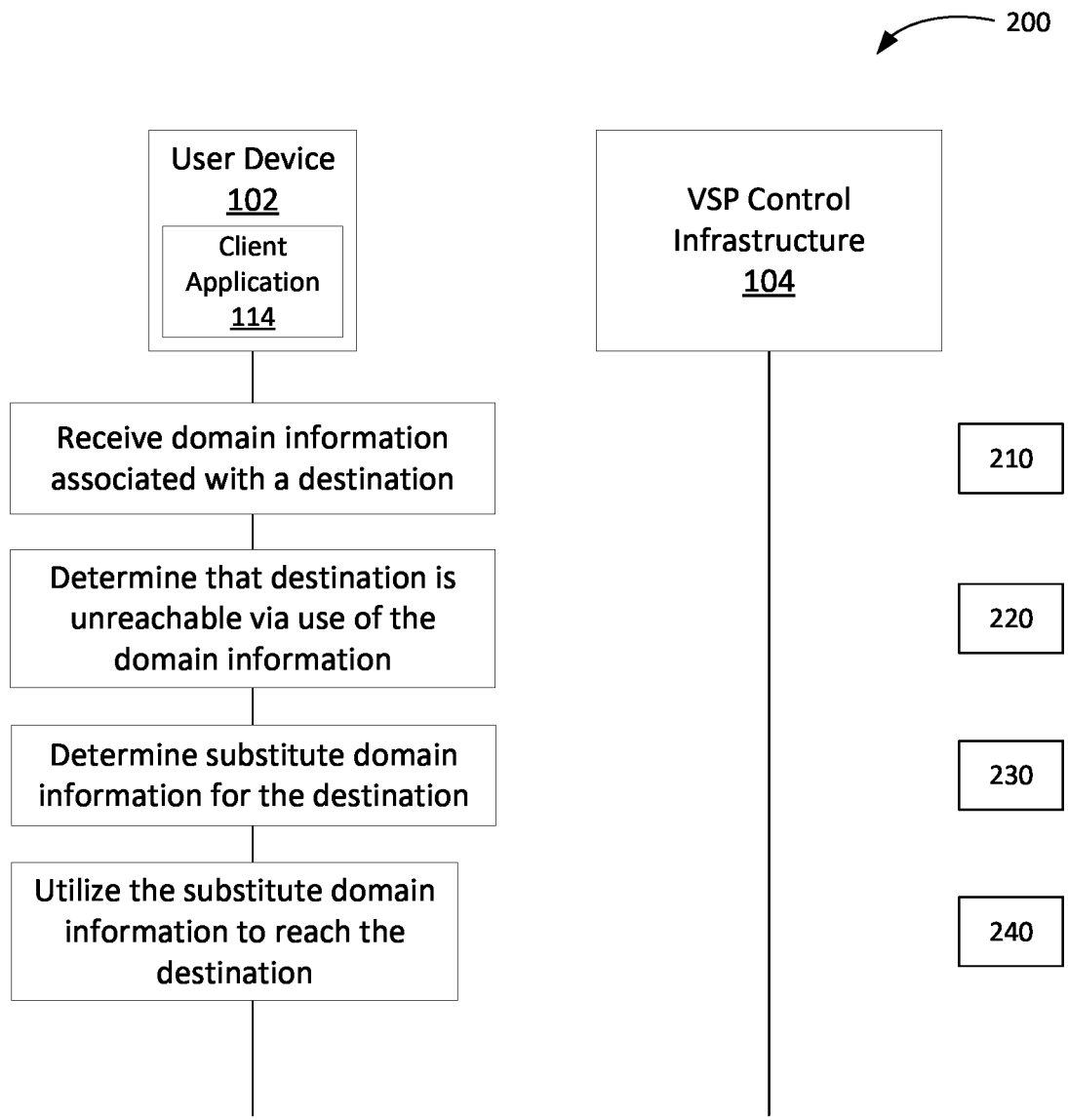

FIG. 2 is an illustration of an example flow associated with providing substitute domain information in a VPN, according to various aspects of the present disclosure.

Figure 3:
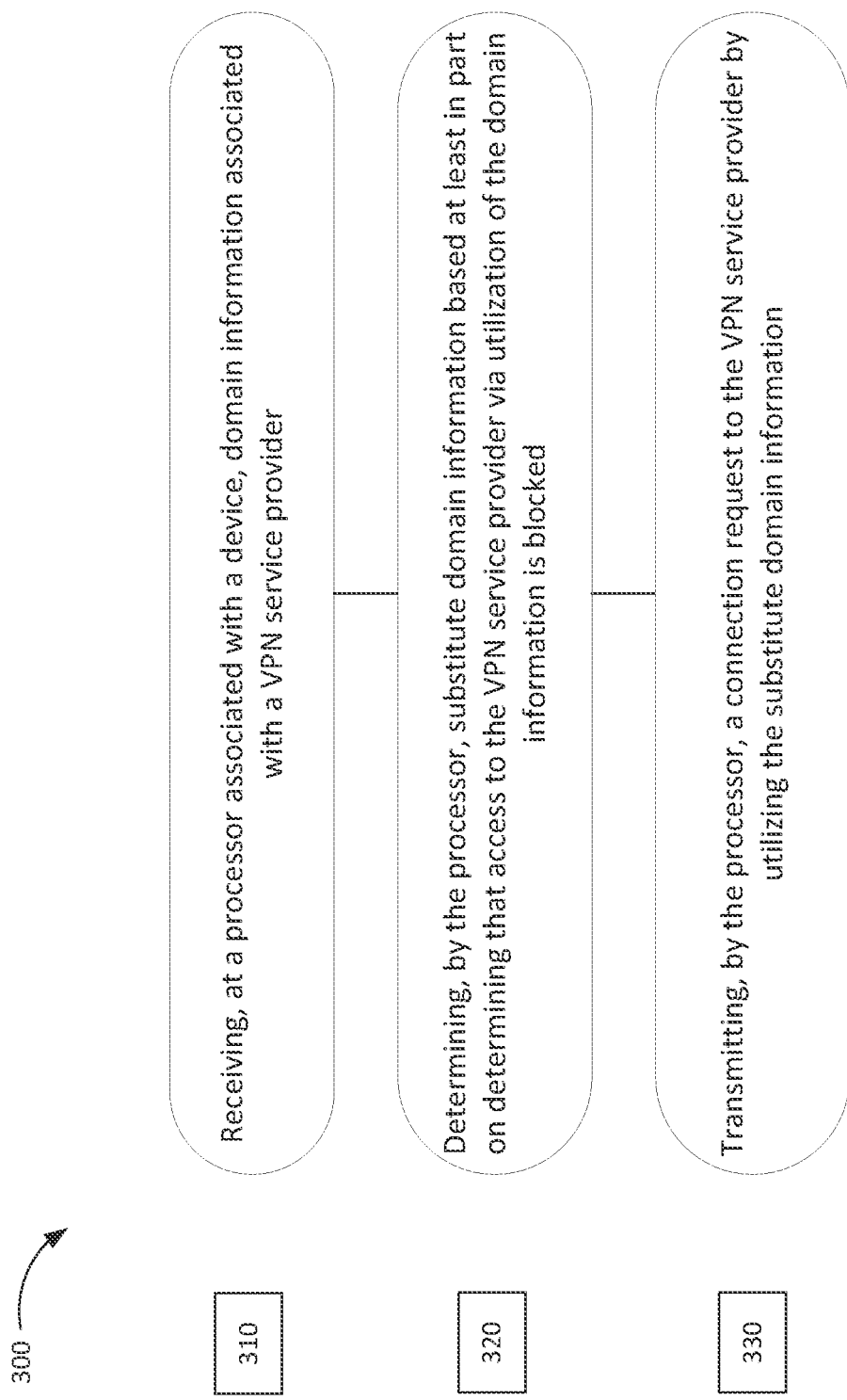

FIG. 3 is an illustration of an example process associated with providing substitute domain information in a VPN, according to various aspects of the present disclosure.

Figure 4:
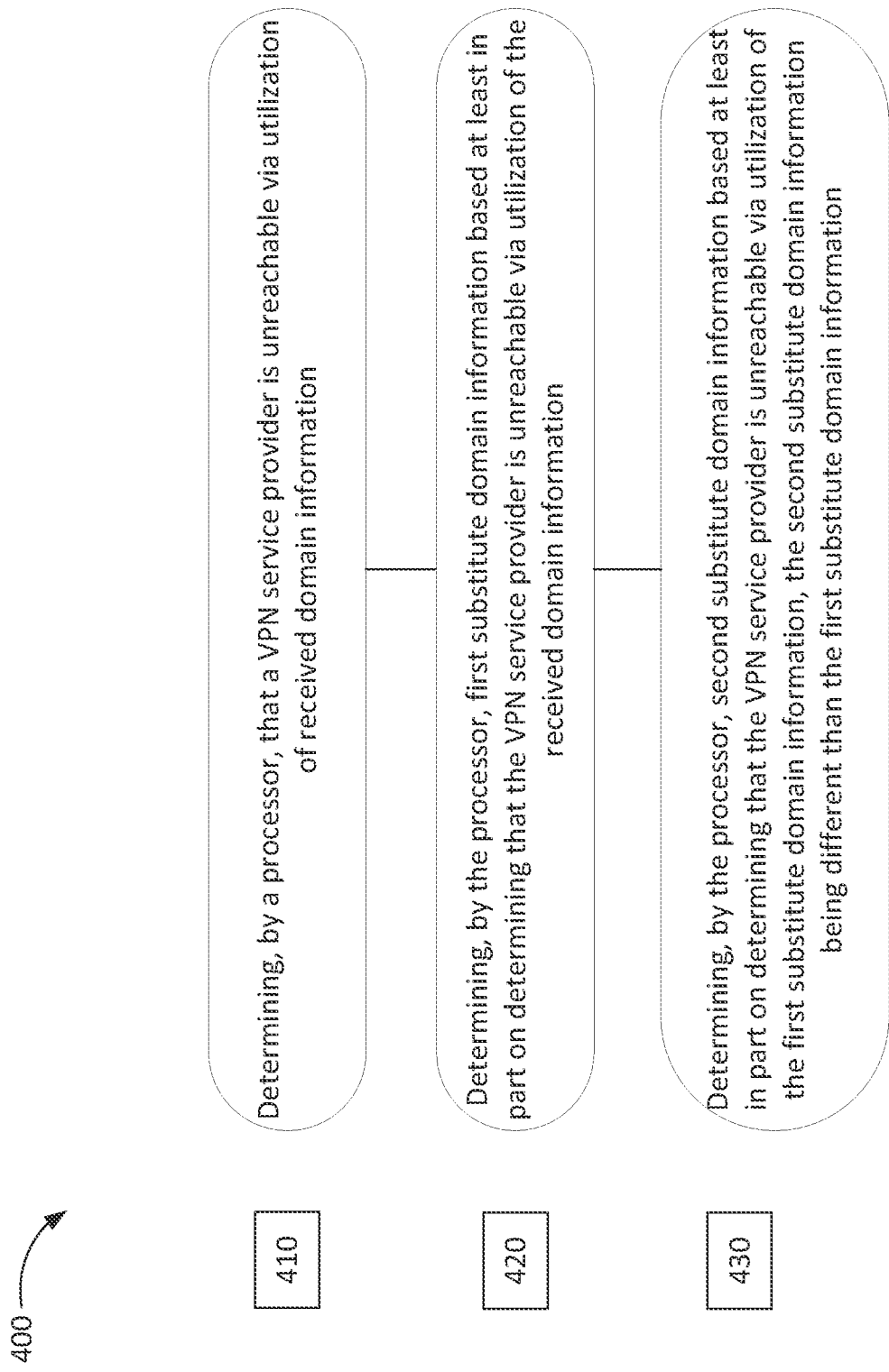

FIG. 4 is an illustration of an example process associated with providing substitute domain information in a VPN, according to various aspects of the present disclosure.

Figure 5:
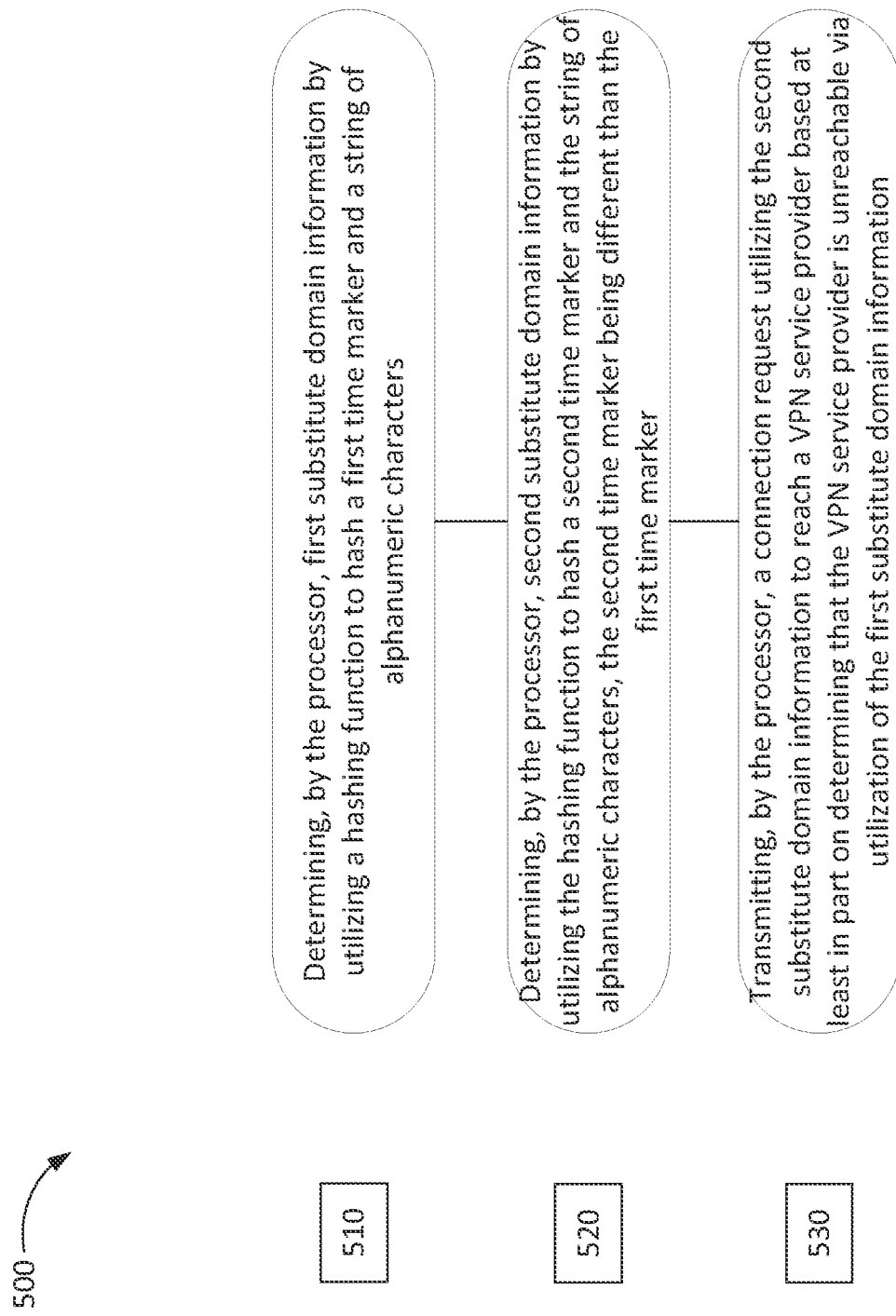

FIG. 5 is an illustration of an example process associated with providing substitute domain information in a VPN, according to various aspects of the present disclosure.

Figure 6:
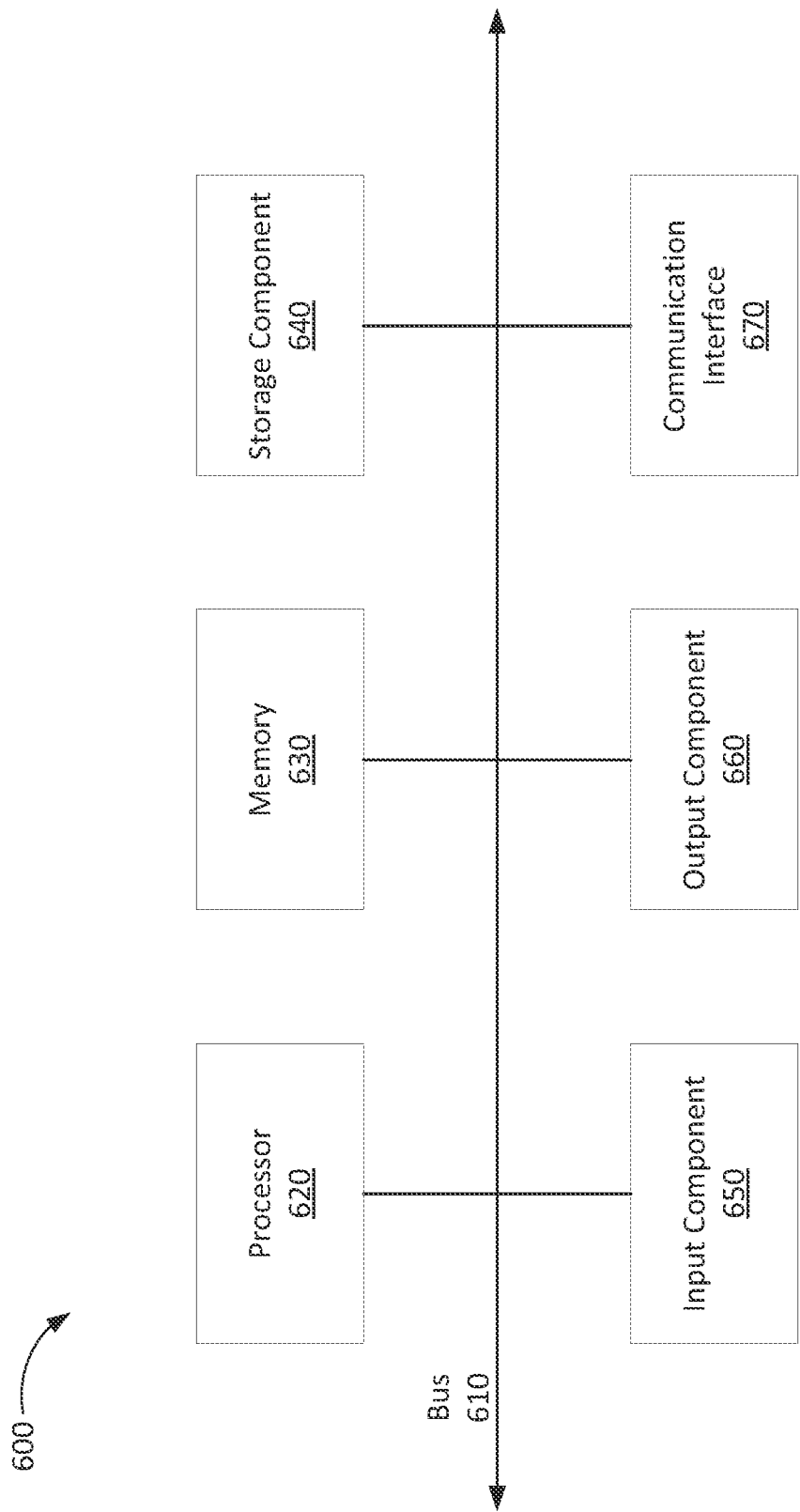

FIG. 6 is an illustration of example devices associated with providing substitute domain information in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with providing substitute domain information in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 112, and the one or more VPN servers 120. In some aspects, the user device 102 may utilize a processing unit 116 and/or a client application 114, which is provided by the VSP control infrastructure 104, to communicate with the API 106. The API 106 may be capable of communicating with the user database 108 and with the processing unit 110. Additionally, the processing unit 110 may be capable of communicating with the server database 112, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 112) included in the VSP control infrastructure 104 and/or included in the user device 102 may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the VSP control infrastructure 104 and/or the user device 102 may be separate and distinct from each other. Alternatively, in some aspects, one or more of the components included in the VSP control infrastructure 104 and/or the user device 102 may be combined with one or more of other components included in the VSP control infrastructure 104. In some aspects, the one or more of the components included in the VSP control infrastructure 104 and/or the user device 102 may be local with respect to each other. Alternatively, in some aspects, one or more of the components included in the VSP control infrastructure 104 and/or the user device 102 may be located remotely with respect to one or more of other components included in the VSP control infrastructure 104 and/or the user device 102. Additionally, or alternatively, one or more components of the components included in the VSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit, via a client application installed on the user device, a connection request to an API associated with the VSP control infrastructure. The client application may utilize a domain name services (DNS) server to resolve domain information associated with the VSP control infrastructure provided by the user device and to determine an Internet protocol (IP) address associated with the API. Based on determining the IP address, the client application may route the connection request to the API. The API may process the connection request and enable the user device to obtain the VPN services.

In some cases, the API associated with the VSP control infrastructure may fail to receive the request transmitted by the client application. In other words, the request may fail to reach the API. For instance, the DNS server may be associated with an Internet Service Provider (ISP) providing network services to the user device, and the ISP may have blocked access to APIs associated with the VSP control infrastructure. In an example, the ISP may recognize that the domain information is associated with the VSP control infrastructure and may block (e.g., disable) access to APIs associated with the VSP control infrastructure by disallowing data (e.g., a connection request) to be transmitted to IP addresses associated with the VSP control infrastructure. In another example, the ISP the ISP may recognize that the domain information is associated with the VSP control infrastructure and may block access to APIs associated with the VSP control infrastructure by identifying a port number and/or a transport protocol associated with data being transmitted to IP addresses associated with the VSP control infrastructure and blocking such data from being transmitted. As a result, the user device may be unable to request and obtain the VPN services.

To reach the API associated with the VSP control infrastructure, the client application may retransmit the connection request several times. Such retransmission of the connection request may inefficiently consume user device resources (e.g., processing resources, memory resources, power consumption resources, battery life, or the like) that can otherwise be used to perform other suitable tasks associated with obtaining the VPN services. Additionally, a delay may be introduced in obtaining the VPN services by the user device.

Various aspects of systems and techniques discussed in the present disclosure enable providing substitute domain information in a VPN. In some aspects, a client application installed on a user device may transmit a connection request to an API associated with a VSP control infrastructure for obtaining VPN services, and an ISP providing network services to the user device may have blocked access to APIs associated with the VSP control infrastructure. In such cases, the systems and techniques discussed herein enable the client application to newly determine, in real time, the substitute domain information to reach the VSP control infrastructure. In some aspects, the client application may independently determine the substitute domain information based at least in part on being unable to communicate with the VSP control infrastructure due to access to the VSP control infrastructure being blocked. Because this substitute domain information is newly determined for use, a DNS server associated with the ISP may not recognize that the substitute domain information is associated with the VSP control infrastructure. As such, the ISP may not block access to the VSP control infrastructure via use of the substitute domain information. Further, in some aspects, the VSP control infrastructure may predetermine and correlate the substitute domain information (to be determined by the user device in the future) with an IP address of an API associated with the VSP control infrastructure. As a result, data (e.g., connection request) transmitted using the substitute domain information may be routed to the API associated with the VSP control infrastructure. In this way, the user device may be enabled to obtain the VPN services from the VSP control infrastructure. By utilizing the above systems and techniques, efficient consumption of user device resources (e.g., processing resources, memory resources, power consumption resources, battery life, or the like) may be enabled. Additionally, a delay in obtaining the VPN services may be avoided.

In some aspects, a processor (e.g., processing unit 110) associated with the user device may receive domain information associated with a VPN service provider; determine substitute domain information based at least in part on determining that access to the VPN service provider via utilization of the domain information is blocked; and transmit a connection request to the VPN service provider by utilizing the substitute domain information.

FIG. 2 is an illustration of an example flow 200 associated with providing substitute domain information in a VPN, according to various aspects of the present disclosure. The example flow 200 may include a user device 102 in communication with a VSP control infrastructure 104 for purposes of obtaining VPN services. In some aspects, the user device 102 may utilize an installed client application 114, provided by the VSP control infrastructure 104, to communicate with an API 106 associated with the VSP control infrastructure 104. The client application 114 and the API 106 may communicate over a network (e.g., network 122). In some aspects, as discussed elsewhere herein, the VSP control infrastructure may enable the user device 102 to obtain the VPN services.

As shown by reference numeral 210, the client application 114 may receive domain information associated with the VSP control infrastructure 104. In an example, the domain information may include information such as a domain name, a network address, and/or a uniform resource locator (URL) link correlated to an IP address associated with the VSP control infrastructure 104. In some aspects, the VSP control infrastructure 104 may provide the client application 114 to be installed on the user device 102. The client application 104 may enable the user device 102 to receive the domain information to be processed by the client application 104 and/or by the VSP control infrastructure 104. The client application 104 may include a graphical interface to receive the domain information via a local input interface (e.g., touch screen, keyboard, mouse, pointer, etc.) associated with the user device 102. The domain information may be received via text input or via a selection from among a plurality of options (e.g., pull down menu, etc.). In some aspects, the client application 114 may activate and/or enable, at a time associated with transmitting the connection request, the graphical interface for receiving the domain information. For instance, the client application 114 may cause a screen (e.g., local screen) associated with the user device 102 to display, for example, a pop-up message to request entry of the domain information. Further, the client application 104 may enable transmission of at least a portion of the domain information to the VSP control infrastructure 104. In some aspects, the client application 114 may utilize the domain information to transmit a connection request to the VSP control infrastructure 104 for purposes of obtaining the VPN services.

Based at least in part on transmitting the connection request, as shown by reference numeral 220, the client application 114 may determine that the API 106 associated with the VSP control infrastructure 104 is unreachable. In an example, as discussed elsewhere herein, the client application 114 may determine that the IP address associated with the API 106 is unreachable because IP addresses and/or ports utilized for communicating (e.g., transmitting and/or receiving) with the VSP control infrastructure 104 are blocked. In some aspects, based at least in part on transmitting the connection request, the client application 114 may receive a null response, a response indicating that the transmitted connection request was received by an entity other than the API 106 associated with the VSP control infrastructure 104, or the like. As a result, the client application 114 may determine that the transmitted connection request failed to reach the API 106.

Based at least in part on determining that the transmitted connection request failed to reach the API 106, as shown by reference numeral 230, the client application 114 may determine, in real-time, substitute domain information for VSP control infrastructure 104. In some aspects, the client application 114 may independently determine the substitute domain information without communicating with the VSP control infrastructure 104.

To determine the substitute domain information, the client application 114 may determine a time marker. In some aspects, the client application 114 may determine one or more time markers such as, for example, a current year, a current month, a current day of the month, a current day of the year, a current week of the month, current week of the year, a current hour of the day, a current minute of the hour, and/or the like. Further, the client application 114 may attach a prefix to a time marker. In some aspects, the prefix may include one or more alphanumeric characters that enable to identify the time marker. For instance, the client application 114 may attach the prefix y to the current year, the prefix m to the current month, the prefix dm to the current day of the month, the prefix dy to the current day of the year, the prefix wm to the current week of the month, the prefix wy to the current week of the year, the prefix h to the current hour of the day, the prefix min to the current minute of the hour, and/or the like. In some aspects, the client application 114 may determine the one or more time markers based at least in part on using Unix time (Epoch time, Posix time) or by any other system for describing a point in time.

The client application 114 may also determine a string of alphanumeric characters associated with the VSP control infrastructure 104. In one example, the string of alphanumeric characters may identify the VSP control infrastructure 104. In another example, the string of alphanumeric characters may include a set of alphanumeric characters predetermined by the client application 114 and the VSP control infrastructure 104 to be used for determining the substitute domain information. In some aspects, the VSP control infrastructure 104 may store the predetermined set of alphanumeric characters in the client application 104. In some aspects, the predetermined set of alphanumeric characters may be unique to the client application 104. The VSP control infrastructure 104 may predetermine the string of alphanumeric characters and may provide the predetermined string of alphanumeric characters to the user device 102 along with the client application.

The client application 114 may determine the substitute domain information by utilizing a cryptographic hash function such as, for example, the SHA-2 hash function. In some aspects, the client application 114 may utilize the cryptographic hash function to hash a combination of one or more time markers and the string of alphanumeric characters associated with the VSP control infrastructure 104. In some aspects, the client application 114 may modify the one or more time markers by attaching one or more alphanumeric characters and/or special characters as a prefix and/or a suffix to the one or more time markers. In an example, the client application 114 may determine the substitute domain information by hashing a combination of the current year and the string of alphanumeric characters (e.g., hash(modified time marker(s)+string of alphanumeric characters)). For instance, when the current year is 2021 and the string of alphanumeric characters is VSPCI104, the client application 114 may determine the substitute domain information as hash(y2021+VSPCI104). In another example, the client application 114 may determine the substitute domain information by hashing a combination of the current year, the current day of the year, and the string of alphanumeric characters. For instance, when the current year is 2021, the current day of the year is the $300^{th}$ day of the year, and the string of alphanumeric characters is VSPCI104, the client application 114 may determine the substitute domain information as hash(y2021+d300y+VSPCI104). In yet another example, the client application 114 may determine the substitute domain information by hashing a combination of the current year, the current day of the year, the current hour of the day, and the string of alphanumeric characters. For instance, when the current year is 2021, the current day of the year is the $250^{th}$ day of the year, the current hour of the day is the $13^{th}$ hour of the day, and the string of alphanumeric characters is VSPCI104, the client application 114 may determine the substitute domain information as hash (y/2021+dy/250+h/13+VSPCI104).

In some aspects, determining the substitute domain information may include adding one or more appropriate levels of domain names to the hashed combination of one or more modified time markers and the string of alphanumeric characters. In an example, the client application 114 may add an appropriate higher level domain name such as, for example, .com, .de, .co.uk, etc. to the hashed combination of one or more prefixed time markers and the string of alphanumeric characters. In such cases, the client application 114 may determine the substitute domain information as, for example, hash(y2021+VSPCI104).com, hash(y2021+dy300+VSPCI104).de, hash(y2021+dy250+h13+VSPCI104).co.uk, etc. In another example, the client application 114 may add an appropriate lower level domain name (e.g., sub domain) such as, for example, www, api, aaa, aa1, ab1, etc. to the hashed combination of one or more prefixed time markers and the string of alphanumeric characters. In such cases, the client application 114 may determine the substitute domain information as, for example, www.hash(y2021+VSPCI104).com, aa1.hash(y2021+dy300+VSPCI104).de, api.hash(y2021+dy250+h13+VSPCI104).co.uk, etc. In some aspects, the lower level domain name may include any number of alphanumeric characters.

Based at least in part on determining the substitute domain information for the VSP control infrastructure 104, as shown by reference numeral 240, the client application 114 may utilize the substitute domain information to reach the API 106 associated with the VSP control infrastructure 104. In some aspects, the client application 114 may determine whether the VSP control infrastructure 104 is reachable via use of the determined substitute domain information. In some aspects, the client application 114 may utilize the substitute domain information to transmit a connection request to the VSP control infrastructure 104 for purposes of obtaining the VPN services. In an example, the client application 114 may utilize the substitute domain information by hashing a combination of the current year and the string of alphanumeric characters (e.g., hash(y2021+VSPCI104).com) to transmit the connection request. When an appropriate response to the connection request is received from the VSP control infrastructure 104, the client application 114 may determine that the VSP control infrastructure 104 is reachable via use of the substitute domain information.

Alternatively, when a null response is received or a response indicating that the transmitted connection request was received by an entity other than the VSP control infrastructure 104 is received, the client application 114 may determine that the transmitted connection request failed to reach the VSP control infrastructure 104 (e.g., the API 106 associated with the VSP control infrastructure 104). In this case, the client application 114 may determine, in real-time, different substitute domain information (e.g., utilizing a different combination of the one or more time markers and the string of alphanumeric characters) to reach the VSP control infrastructure 104. In an example, the client application 114 may utilize the substitute domain information determined by hashing a combination of the current year, the current day of the year, and the string of alphanumeric characters (e.g., hash(y2021+dy300+VSPCI104).com) to reach the VSP control infrastructure 104. When an appropriate response to the connection request is received from the VSP control infrastructure 104, the client application 114 may determine that the VSP control infrastructure 104 is reachable via use of the substitute domain information.

Alternatively, when a null response is received or a response indicating that the transmitted connection request was received by an entity other than the VSP control infrastructure 104 is received, the client application 114 may determine that the transmitted connection request failed to reach the VSP control infrastructure 104. In this case, the client application 114 may determine, in real-time, different substitute domain information (e.g., utilizing a different combination of the one or more time markers and the string of alphanumeric characters) to reach the VSP control infrastructure 104. In this way, the client application 114 may continue to determine substitute domain information utilizing different combinations of the one or more time markers and the string of alphanumeric characters until an appropriate response to the connection request is received from the VSP control infrastructure 104 indicating that the VSP control infrastructure 104 is reachable via use of the substitute domain information.

Based at least in part on the systems and techniques discussed herein to utilize substitute domain information to reach the VSP control infrastructure, a user device may be enabled to obtain the VPN services from the VSP control infrastructure. Further, efficient consumption of user device resources (e.g., processing resources, memory resources, power consumption resources, battery life, or the like) may be enabled. Additionally, a delay in obtaining the VPN services may be avoided.

As indicated above, FIG. 2 is provided as an example. Other examples may differ from what is described with regard to FIG. 2.

FIG. 3 is an illustration of an example process 300 associated with providing substitute domain information in a VPN, according to various aspects of the present disclosure. In some aspects, the process 300 may be performed by a memory and/or a processor/controller (e.g., processing unit 116, processor 620) associated with a user device (e.g., user device 102) executing a client application. As shown by reference numeral 310, process 300 may include receiving, at a processor associated with a device, domain information associated with a VPN service provider. For instance, the user device may utilize a communication interface (e.g., communication interface 670) and the associated memory and/or processor to receive domain information associated with a VPN service provider, as discussed elsewhere herein.

As shown by reference numeral 320, process 300 may include determining, by the processor, substitute domain information based at least in part on determining that the VPN service provider is unreachable via utilization of the domain information, the determining the substitute domain information being based at least in part on utilizing a time marker and a string of alphanumeric characters associated with the VPN service provider. For instance, the user device may utilize the associated memory and/or processor to determine substitute domain information based at least in part on determining that the VPN service provider is unreachable via utilization of the domain information, the determining the substitute domain information being based at least in part on utilizing a time marker and a string of alphanumeric characters associated with the VPN service provider, as discussed elsewhere herein.

As shown by reference numeral 330, process 300 may include transmitting, by the processor, a connection request to reach the VPN service provider by utilizing the substitute domain information. For instance, the user device may utilize a communication interface (e.g., communication interface 670) and the associated memory and/or processor to transmit a connection request to reach the VPN service provider by utilizing the substitute domain information, as discussed elsewhere herein.

Process 300 may include additional aspects, such as any single aspect or any combination of aspects described below and/or in connection with one or more other processes described elsewhere herein.

In a first aspect, in process 300, determining the substitute domain information includes utilizing a hashing function.

In a second aspect, alone or in combination with the first aspect, in process 300, determining the substitute domain information includes utilizing a hashing function to hash data associated with the time marker and the predetermined string of alphanumeric characters.

In a third aspect, alone or in combination with the first through second aspects, in process 300, determining the substitute domain information includes determining the substitute domain information in real time.

In a fourth aspect, alone or in combination with the first through third aspects, in process 300, the string of alphanumeric characters is predetermined.

In a fifth aspect, alone or in combination with the first through fourth aspects, in process 300, receiving the domain information includes receiving the domain information via a client application associated with the VPN service provider.

In a sixth aspect, alone or in combination with the first through fifth aspects, in process 300, the string of alphanumeric characters enables to identify the VPN service provider.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with providing substitute domain information in a VPN, according to various aspects of the present disclosure. In some aspects, the process 400 may be performed by a memory and/or a processor/controller (e.g., processing unit 116, processor 620) associated with a user device (e.g., user device 102) executing a client application. As shown by reference numeral 410, process 400 may include determining, by a processor, that a VPN service provider is unreachable via utilization of received domain information. For instance, the user device may utilize the associated memory and/or processor to determine that a VPN service provider is unreachable via utilization of received domain information, as discussed elsewhere herein.

As shown by reference numeral 420, process 400 may include determining, by the processor, first substitute domain information based at least in part on determining that the VPN service provider is unreachable via utilization of the received domain information. For instance, the user device may utilize the associated memory and/or processor to determine first substitute domain information based at least in part on determining that the VPN service provider is unreachable via utilization of the received domain information, as discussed elsewhere herein.

As shown by reference numeral 430, process 400 may include determining, by the processor, second substitute domain information based at least in part on determining that the VPN service provider is unreachable via utilization of the first substitute domain information, the second substitute domain information being different than the first substitute domain information. For instance, the user device may utilize the associated memory and/or processor to determine second substitute domain information based at least in part on determining that the VPN service provider is unreachable via utilization of the first substitute domain information, the second substitute domain information being different than the first substitute domain information, as discussed elsewhere herein.

Process 400 may include additional aspects, such as any single aspect or any combination of aspects described below and/or in connection with one or more other processes described elsewhere herein.

In a first aspect, in process 400, determining the first substitute domain information includes utilizing a first hash function, and determining the second substitute domain information includes utilizing a second hash function.

In a second aspect, alone or in combination with the first aspect, in process 400, determining the first substitute domain information includes utilizing a first combination of one or more time markers and an alphanumeric string, and determining the second substitute domain information includes utilizing a second combination of the one or more time markers and the alphanumeric string.

In a third aspect, alone or in combination with the first through second aspects, in process 400, determining the first substitute domain information includes utilizing a first time marker and an alphanumeric string, the first time marker including a first prefix, and determining the second substitute domain information includes utilizing a second time marker and the alphanumeric string, the second time marker including a second prefix.

In a fourth aspect, alone or in combination with the first through third aspects, in process 400, determining the first substitute domain information includes adding a first domain name associated with the VPN service provider, and determining the second substitute domain information includes adding a second domain name associated with the VPN service provider.

In a fifth aspect, alone or in combination with the first through fourth aspects, in process 400, determining the first substitute domain information includes determining the first substitute domain information in real time, and determining the second substitute domain information includes determining the second substitute domain information in real time.

In a sixth aspect, alone or in combination with the first through fifth aspects, in process 400, determining that the VPN service provider is unreachable includes determining that access to an internet protocol (IP) address associated with the VPN service provider is disabled.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with providing substitute domain information in a VPN, according to various aspects of the present disclosure. In some aspects, the process 500 may be performed by a memory and/or a processor/controller (e.g., processing unit 116, processor 620) associated with a user device (e.g., user device 102) executing a client application. As shown by reference numeral 510, process 500 may include determining, by the processor, first substitute domain information by utilizing a hashing function to hash a first time marker and a string of alphanumeric characters. For instance, the user device may utilize the associated memory and/or a processor to determine first substitute domain information by utilizing a hashing function to hash a first time marker and a string of alphanumeric characters, as discussed elsewhere herein.

As shown by reference numeral 520, process 500 may include determining, by the processor, second substitute domain information by utilizing the hashing function to hash a second time marker and the string of alphanumeric characters, the second time marker being different than the first time marker. For instance, the user device may utilize the associated memory and/or processor to determine second substitute domain information by utilizing the hashing function to hash a second time marker and the string of alphanumeric characters, the second time marker being different than the first time marker, as discussed elsewhere herein.

As shown by reference numeral 530, process 500 may include transmitting, by the processor, a connection request utilizing the second substitute domain information to reach a VPN service provider based at least in part on determining that the VPN service provider is unreachable via utilization of the first substitute domain information. For instance, the user device may utilize a communication interface (e.g., communication interface 670) and the associated memory and/or processor to transmit a connection request utilizing the second substitute domain information to reach a VPN service provider based at least in part on determining that the VPN service provider is unreachable via utilization of the first substitute domain information, as discussed elsewhere herein.

Process 500 may include additional aspects, such as any single aspect or any combination of aspects described below and/or in connection with one or more other processes described elsewhere herein.

In a first aspect, in process 500, the first time marker includes a first prefix, and the second time marker includes a second prefix.

In a second aspect, alone or in combination with the first aspect, in process 500, the first time marker includes a first combination of one or more time markers, and the second time marker includes a second combination of the one or more time markers.

In a third aspect, alone or in combination with the first through second aspects, in process 500, the first time marker includes a first time marker associated with a first duration of time, and the second time marker includes a combination of the first time marker associated with the first duration of time and a second time marker associated with a second duration of time.

In a fourth aspect, alone or in combination with the first through third aspects, in process 500, determining the first substitute domain information includes determining the first substitute domain information in real time, and determining the second substitute domain information includes determining the second substitute domain information in real time.

In a fifth aspect, alone or in combination with the first through fourth aspects, in process 500, the string of alphanumeric characters is predetermined and identifies the VPN service provider.

In a sixth aspect, alone or in combination with the first through fifth aspects, in process 500, determining the first substitute domain information includes adding a first domain name associated with the VPN service provider, and determining the second substitute domain information includes adding a second domain name associated with the VPN service provider.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with providing substitute domain information in a VPN, according to various aspects of the present disclosure. In some aspects, the example devices 600 may form part of or implement the systems, servers, environments, infrastructures, components, devices, or the like described elsewhere herein (e.g., VSP control infrastructure, VPN server, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method in a virtual private network (VPN) service environment, the method comprising:
   determining, by a processor, that a VPN service provider is unreachable via utilization of domain information associated with reaching the VPN service provider, the VPN service provider being available to provide VPN services based at least in part on configuring one or more VPN servers;
   determining, by the processor, first substitute domain information to reach the VPN service provider based at least in part on determining that the VPN service provider is unreachable via utilization of the domain information; and
   determining, by the processor, second substitute domain information to reach the VPN service provider based at least in part on determining that the VPN service provider is unreachable via utilization of the first substitute domain information, the second substitute domain information being different than the first substitute domain information, wherein
determining the first substitute domain information includes utilizing a first combination of one or more time markers and an alphanumeric string, or
determining the second substitute domain information includes utilizing a second combination of the one or more time markers and the alphanumeric string.

2. The method of claim 1, wherein
determining the first substitute domain information includes utilizing a first hash function, and
determining the second substitute domain information includes utilizing a second hash function.

3. The method of claim 1, wherein the one or more time markers identifies a current time period associated with determining the first substitute domain information or determining the second substitute domain information.

4. The method of claim 1, wherein
determining the first substitute domain information includes utilizing a first time marker and an alphanumeric string, the first time marker including a first prefix, and
determining the second substitute domain information includes utilizing a second time marker and the alphanumeric string, the second time marker including a second prefix.

5. The method of claim 1, wherein
determining the first substitute domain information includes adding a first domain name associated with the VPN service provider, and
determining the second substitute domain information includes adding a second domain name associated with the VPN service provider.

6. The method of claim 1, wherein
determining the first substitute domain information includes determining the first substitute domain information in real time, and
determining the second substitute domain information includes determining the second substitute domain information in real time.

7. The method of claim 1, wherein determining that the VPN service provider is unreachable includes determining that access to an internet protocol (IP) address associated with the VPN service provider is disabled.

8. A device, comprising:
a memory; and
a processor communicatively coupled to the memory, the memory and the processor being configured to:
determine that a VPN service provider is unreachable via utilization of domain information associated with reaching the VPN service provider, the VPN service provider being available to provide VPN services based at least in part on configuring one or more VPN servers;
determine first substitute domain information to reach the VPN service provider based at least in part on determining that the VPN service provider is unreachable via utilization of the domain information; and
determine second substitute domain information to reach the VPN service provider based at least in part on determining that the VPN service provider is unreachable via utilization of the first substitute domain information, the second substitute domain information being different than the first substitute domain information, wherein
to determine the first substitute domain information, the memory and the processor are configured to utilize a first combination of one or more time markers and an alphanumeric string, or
to determine the second substitute domain information, the memory and the processor are configured to utilize a second combination of the one or more time markers and the alphanumeric string.

9. The device of claim 8, wherein
to determine the first substitute domain information, the memory and the processor are configured to utilize a first hash function, and
to determine the second substitute domain information, the memory and the processor are configured to utilize a second hash function.

10. The device of claim 8, wherein the one or more time markers identifies a current time period associated with determining the first substitute domain information or determining the second substitute domain information.

11. The device of claim 8, wherein
to determine the first substitute domain information, the memory and the processor are configured to utilize a first time marker and an alphanumeric string, the first time marker including a first prefix, and
to determine the second substitute domain information, the memory and the processor are configured to utilize a second time marker and the alphanumeric string, the second time marker including a second prefix.

12. The device of claim 8, wherein
to determine the first substitute domain information, the memory and the processor are configured to add a first domain name associated with the VPN service provider, and
to determine the second substitute domain information, the memory and the processor are configured to add a second domain name associated with the VPN service provider.

13. The device of claim 8, wherein
to determine the first substitute domain information, the memory and the processor are configured to determine the first substitute domain information in real time, and
to determine the second substitute domain information, the memory and the processor are configured to determine the second substitute domain information in real-time.

14. The device of claim 8, wherein, to determine that the VPN service provider is unreachable, the memory and the processor are configured to determine that access to an internet protocol (IP) address associated with the VPN service provider is disabled.

15. A non-transitory computer-readable medium configured to store instructions, which when executed by a processor associated with a virtual private network (VPN), cause the processor to:
determine that a VPN service provider is unreachable via utilization of domain information associated with reaching the VPN service provider, the VPN service provider being available to provide VPN services based at least in part on configuring one or more VPN servers;
determine first substitute domain information to reach the VPN service provider based at least in part on determining that the VPN service provider is unreachable via utilization of the domain information; and
determine second substitute domain information to reach the VPN service provider based at least in part on determining that the VPN service provider is unreachable via utilization of the first substitute domain information, the second substitute domain information being different than the first substitute domain information, wherein to determine the first substitute domain information, the processor is configured to utilize a first combination of one or more time markers and an alphanumeric string, or to determine the second substitute domain information, the processor is configured to utilize a second combination of the one or more time markers and the alphanumeric string.

16. The non-transitory computer-readable medium of claim 15, wherein to determine the first substitute domain information, the processor is configured to utilize a first hash function, and to determine the second substitute domain information, the processor is configured to utilize a second hash function.

17. The non-transitory computer-readable medium of claim 15, wherein (Original) The non-transitory computer-readable medium of claim 15, wherein to determine the first substitute domain information, the processor is configured to utilize a first time marker and an alphanumeric string, the first time marker including a first prefix, and to determine the second substitute domain information, the processor is configured to utilize a second time marker and the alphanumeric string, the second time marker including a second prefix.

18. The non-transitory computer-readable medium of claim 15, wherein to determine the first substitute domain information, the processor is configured to add a first domain name associated with the VPN service provider, and to determine the second substitute domain information, the processor is configured to add a second domain name associated with the VPN service provider.

19. The non-transitory computer-readable medium of claim 15, wherein to determine the first substitute domain information, the processor is configured to determine the first substitute domain information in real time, and to determine the second substitute domain information, the processor is configured to determine the second substitute domain information in real-time.

20. The non-transitory computer-readable medium of claim 15, wherein to determine the first substitute domain information, the processor is configured to determine the first substitute domain information in real time, and to determine the second substitute domain information, the processor is configured to determine the second substitute domain information in real-time.

* * * * *